United States Patent [19]

Glenn, Jr.

[11] 3,732,363

[45] May 8, 1973

[54] INFORMATION RECORD UTILIZING DIFFRACTION GRATING AND METHODS OF RECORDING AND REPRODUCING THE INFORMATION THEREOF

[75] Inventor: William E. Glenn, Jr., Stamford, Conn.

[73] Assignee: Columbia Broadcasting System, Inc., New York, N.Y.

[22] Filed: Aug. 16, 1971

[21] Appl. No.: 171,809

[52] U.S. Cl. ...178/6.6 TP, 178/5.4 BD, 179/100.3 G, 346/74 TP, 346/76 L, 346/77 E

[51] Int. Cl. ..........................G01d 15/10, G11b 7/26

[58] Field of Search ....................178/6.6 TP, 5.4 BD; 346/74 TP, 77 E, 76 L; 179/100.3 G

[56] References Cited

UNITED STATES PATENTS 3,281,798 10/1966 Glenn ..............................178/6.6 TP 3,535,417 10/1970 Henkes ............................346/74 TP

*Primary Examiner*—Howard W. Britton

*Attorney*—Spencer E. Olson

[57] ABSTRACT

In a system for recording and reproducing picture information, a record medium utilizing diffraction gratings modulated in accordance with the picture information which, upon reproduction effected by directing light therethrough, the zero-order diffracted light is modulated in accordance with the picture information. The picture information-representing diffraction grating is initially recorded on a master from which release prints may be made on inexpensive sheet plastic material, for example, by mechanical embossing techniques.

19 Claims, 10 Drawing Figures

INVENTOR.
WILLIAM E. GLENN, JR.
BY [signature]
ATTORNEY

INVENTOR.
WILLIAM E. GLENN, JR.
BY
Spencer E. Olson
ATTORNEY

INVENTOR.
WILLIAM E. GLENN, JR.
BY
Spencer E. Olson
ATTORNEY

INFORMATION RECORD UTILIZING DIFFRACTION GRATING AND METHODS OF RECORDING AND REPRODUCING THE INFORMATION THEREOF

BACKGROUND OF THE INVENTION

This invention relates generally to the recording and reproduction of picture information, and more particularly to methods for recording picture information on a recording medium, and to the recordings themselves. More specifically, it relates to the utilization of diffraction gratings modulated in accordance with the picture information to be stored which, upon playback effected by directing light through the record medium, the zero-order diffracted light is modulated in accordance with the picture information.

Information of many types is conventionally recorded on photographic film, such as monochrome film consisting of a transparent base coated with a photo-reactive chemical such as a silver halide emulsion, which upon being developed produces variations in the transparency of the film corresponding to the light image to which the film has been exposed. In the case of a monochrome recording, all areas of the film have a substantially similar effect on visible light of different wave lengths, and the variations in transparency from the most transparent areas to the least transparent areas are said to form a gray scale. Monochrome film can and has been used to record a wide variety of information, including information pertaining to color images. For example, a systm for electronically recording and reproducing color video information is described in an article entitled "Color EVR" appearing in the September 1970 issue of the *IEEE Spectrum*. In this system, color television signals are recorded in two successions of side-by-side frames on high resolution monochrome film, with one frame of each companion pair containing luminance information in visible form as a black and white picture of a scene, and the other frame of the pair containing coded color information which appears on the film as a series of very fine vertical bars. Although the frames described in the referenced article are quite small, they are capable of storing large amounts of information, be it motion or still picture information. However, to achieve quality pictures with such small frames requires high-precision recording equipment, such as an electron beam recorder which exposes the film in vacuum with a finely focused electron beam. The master film thus produced is duplicated with a suitable contact printer to produce release prints in relatively large numbers for commercial distribution.

The practical availability of pre-recorded video programs to the general public depends to a large extent on the cost of the record medium intended for mass distribution. The cost of producing the monochrome film record medium for the above-described system with the precision required for quality reproduction is necessarily quite high, and the cost of the film itself represents a significant portion of the cost. Thus, it is desirable, and it is a principal object of the present invention, to reduce the cost to the consumer of the record medium for pre-recorded video programs (or other information).

Another shortcoming of conventional monochrome film recordings is that the film can be easily and relatively inexpensively reproduced by contact printing. Thus, for example, if the release print, for example, microfilm, contains copyrighted material, the seller of the film can not effectively prevent the purchaser from making unauthorized duplicate copies. It is another object of the present invention to provide a record medium which can not be reproduced by conventional contact printing techniques.

SUMMARY OF THE INVENTION

Briefly, these and other objects are attained by a novel method of recording the information on a master record which enables replication of multiple release prints by mechanically embossing the information on the master onto the release print material. Thus, the material from which the release prints are made may consist essentially of only a film base; it requires no photo-reactive coating thereon and, accordingly, is inexpensive and requires no processing other than a mechanical embossing operation.

To record the information and produce a master from which copies can be replicated, it is initially recorded as variations in the amplitude of a diffraction-grating pattern also formed on the initial record medium. The diffraction grating may be formed in several ways, and several alternative methods may be used to apply the picture information to the grating. In a preferred embodiment of the method, a photoresist material is first exposed to two laser beams which come together at the photoresist surface at an angle of about 30° to produce a stripe diffraction-grating pattern having a predetermined spacing by the alternating constructive and destructive interference of the laser beams. Then, the photoresist having the latent image of the diffraction-grating pattern thereon, is exposed through a transparency containing the picture information to produce a superimposed latent image of the picture information. This is essentially a contact printing step in which the light, preferably ultraviolet to which the photoresist is sensitive, or the scanning beam of an electron beam recorder, is directed through a positive transparency of the picture information in order to obtain a positive in the final replicated release print. Upon development of the photoresist, the picture information appears as a modulation in amplitude of the phase grating. That is, where the photoresist is exposed to the picture information, the photoresist upon development remains to give a grating in those areas, and where it is not exposed the photoresist is washed away to remove the grating in those areas, more or less of the grating being retained depending upon the gray scale of the original positive transparency of the picture information.

Alternatively, the diffraction grating may be mechanically embossed in the photoresist coating of the initial record medium, and the photoresist thereafter exposed, as by contact printing with ultraviolet light directed through a transparency of the picture information to be recorded. Upon development, where the photoresist has been exposed to maximum light the photoresist remains to retain the grating, and where it is not exposed the photoresist washes away to remove the grating. Either positive or negative photoresist may be used; if it is of the type that becomes insoluble when exposed to light, the picture information is exposed through a negative, and if the photoresist is of the type that becomes soluble upon exposure, the picture information is exposed through a positive.

Still another method of producing the initial record consists in the step of directing two radiant energy beams, such as a pair of laser beams, through a negative transparency containing the picture information onto a suitable photoresist coating thereby to produce a latent image of a diffraction grating pattern modulated in accordance with the picture information contained in the negative. Thus, upon development of the photoresist, more or less of the diffraction grating pattern remains (that is, the intensity of the diffraction grating pattern varies) in accordance with the picture information.

The developed photoresist, exposed by either of the above-described methods, thus has a three-dimensional pattern thereon representative of the picture information to which it was exposed. In accordance with another important aspect of the invention, a master for replication of multiple copies of the stored information is produced by electroforming on top of the photoresist, much in the same way that masters are made for replicating phonograph records, to produce a metal-coated tape having the same three-dimensional pattern thereon. Multiple copies are made by pressing the master tape against a suitable release print material, which may be inexpensive sheet plastic, by heating the master tape and carrying it and the sheet plastic together over a drum whereby the plastic flows into the ripples of the pattern on the master. The plastic and master are cooled while in contact with the drum and as the master and sheet plastic leave the drum the plastic is stripped from the master to produce a replica of the master embossed in the plastic film without any loss of resolution.

The time and intensity of the initial exposure of the photoresist is selected so that the areas of the sheet plastic release film corresponding to the greatest transparency of the original negative (or positive) have a grating depth which causes a portion of the zero-order diffracted light from a collimated beam passing through the release print to be approximately one-half wavelength out-of-phase with the remainder of the zero-order light as it emerges from the grating. Destructive interference occurs between the two portions of the zero-order light, and the attenuation of this light by the grating varies according to the gray scale represented by the ripple pattern on the grating. For good contrast, the light transmitted by the film is viewed with a projection lens that has an angle of acceptance that excludes the first- and higher-order diffracted light. With gratings of proper dimensions no light passes through the lens from those areas where the grating is present, but in areas where the grating is absent the light goes through in the same way it normally does with clear film. Thus, as was noted earlier, gray scale is controlled by variations in the amplitude of the grating which, in turn, is determined by the transmission characteristics of the original transparency.

BRIEF DESCRIPTION OF THE DRAWINGS

Other objects and features of the invention will become apparent and a better understanding of its construction and operation will be had from the following detailed description taken in conjunction with the accompanying drawings, in which.

DESCRIPTION OF THE PREFERRED EMBODIMENTS

Figure 1:
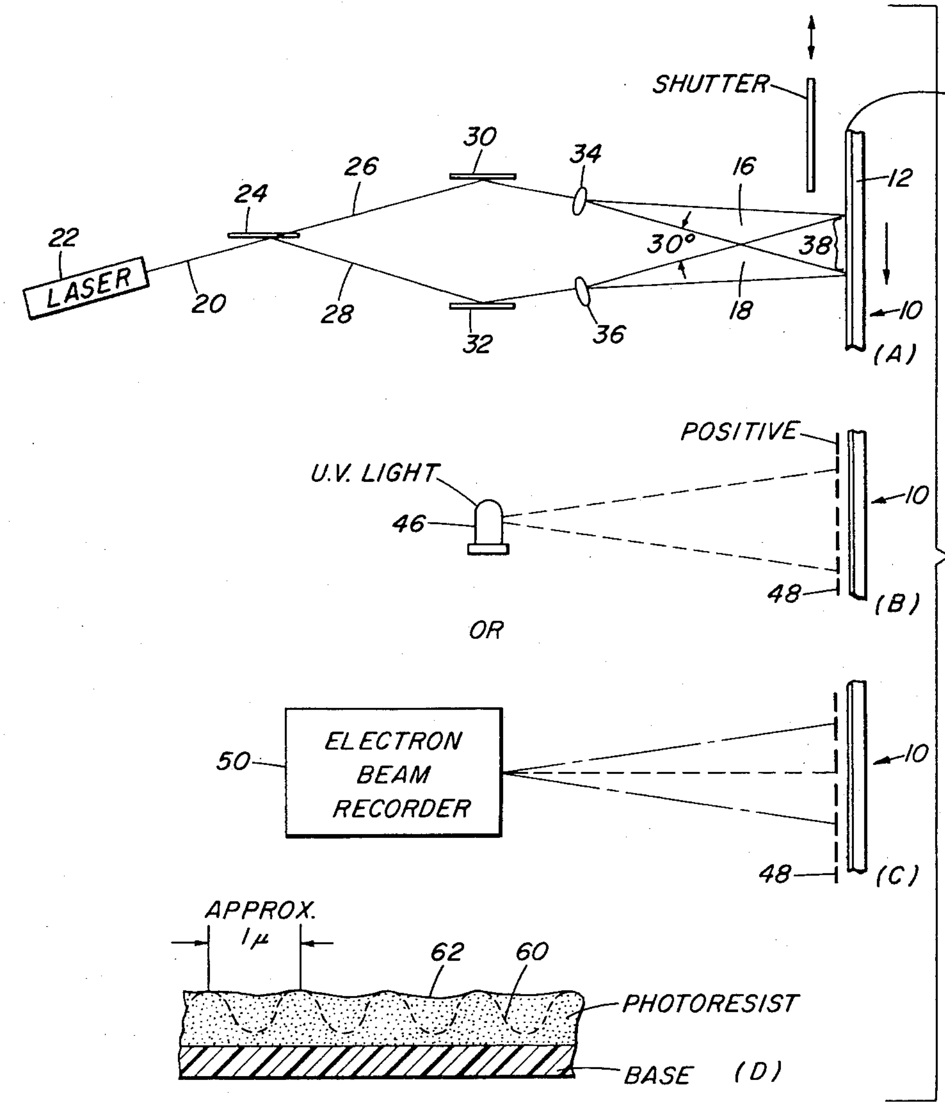
FIG. 1 is a schematic diagram illustrating the steps of a preferred method according to the invention for making a master recording.

In accordance with the invention, the picture information is initially recorded as variations in the transparency of a diffraction-grating pattern formed on the initial record medium. In the preferred embodiment of the method, the steps of which are diagrammatically illustrated in FIG. 1, the record medium 10 from which the master is made is a film having a base 12 on which there is a coating of photoresist 14. As illustrated in FIG. 1(A) the photoresist 14 is first exposed to two laser beams 16 and 18 which come together at the photoresist surface at an angle of about 30° to produce a stripe diffraction-grating pattern having a predetermined spacing by the alternating constructive and destructive interference of the laser beams. With an angle of 30° between the two beams, the spacing between the stripes is approximately one micron. The two beams are conveniently produced by directing the beam 20 from a laser 22 onto a half-mirror 24, which divides the beam into two components 26 and 28 which are respectively re-directed by two mirrors 30 and 32. The beams reflected by mirrors 30 and 32 are focused by respective lenses 34 and 36 to produce the two beams 16 and 18 which intersect at an angle of about 30° to each other and fall on a common area 38 of the photoresist. Thus, the film 10, which is advanced in the direction of the arrow by suitable transport means (not shown) has the grating exposed on the photoresist throughout the area 38 when the film is stationary, the grating lines extending transversely of the film. After exposure in the position shown, the laser beams are shielded from the film by a suitable shutter 40 moved into position in front of the area 38 for a time sufficient for the film to be intermittently advanced to present the next frame, whereupon the shutter is withdrawn to the position shown.

Figure 2:
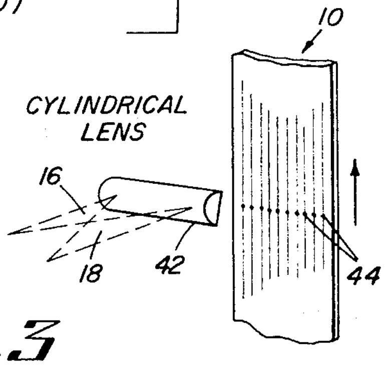
FIG. 2 is a schematic diagram illustrating an arrangement for exposing a diffraction grating on a continuously moving master recording medium.

Alternatively, a diffraction grating having stripes extending longitudinally of the film can be exposed on a continuously moving film by the arrangement schematically illustrated in FIG. 2, wherein the film 10 is continuously transported in the direction of the arrow and the intersecting laser beams 16 and 18 are directed onto a cylindrical lens 42 placed in front of the film, whereby the interference pattern caused by the intersecting beams appears as a series of dots 44 lying along a line transversely of the film. Consequently, as the film is continuously moved, the spots trace a corresponding number of longitudinally extending lines which constitute the diffraction-grating. It will, of course, be appreciated that the illustrated spacing between lines is greatly exaggerated in the interest of clarity; actually the spacing between the lines is approximately one micron.

Returning now to FIG. 1(B), the photoresist having the latent image of the diffraction-grating pattern thereon, is next additionally exposed through a transparency containing the picture information to produce a superimposed latent image of the picture information. This is essentially a contact printing step in which light, preferably ultraviolet light from a source 46, is directed through a positive transparency 48 of the picture information; for reasons which will become apparent, exposure through a positive transparency is necessary in order to obtain a positive in the final replicated release print. Alternatively, as illustrated in FIG. 1(C), the photoresist may be exposed through the positive transparency 48 by the scanning electron beam of an electron beam recorder 50, it being understood that in this case the photoresist is sensitive to electron bombardment.

Following exposure by one of the above-described series of steps, the photoresist is developed, the picture information appearing as a ripple pattern on the diffraction grating. Where the photoresist is exposed to the picture information, the photoresist upon development remains to give a grating in those areas, and where it is not exposed the photoresist is soluble and washes away to remove the grating in those areas, more or less of the grating being retained depending upon the gray scale of the original positive transparency. This is schematically illustrated in FIG. 1(D) in which the dot-dash line 60 represents (greatly exaggerated) the cross-section of the grating that would be produced if the photoresist were developed after the first exposure; that is, without having the picture information exposed thereon. The solid line 62 represents an area of the photoresist (after development) which has been further exposed through an almost white area of the transparency, the additional exposure causing the photoresist to remain to give a grating in this area. Had the area been black, the lesser exposure of the photoresist would cause it to be more soluble whereby the grating would be removed upon development.

Figure 3:
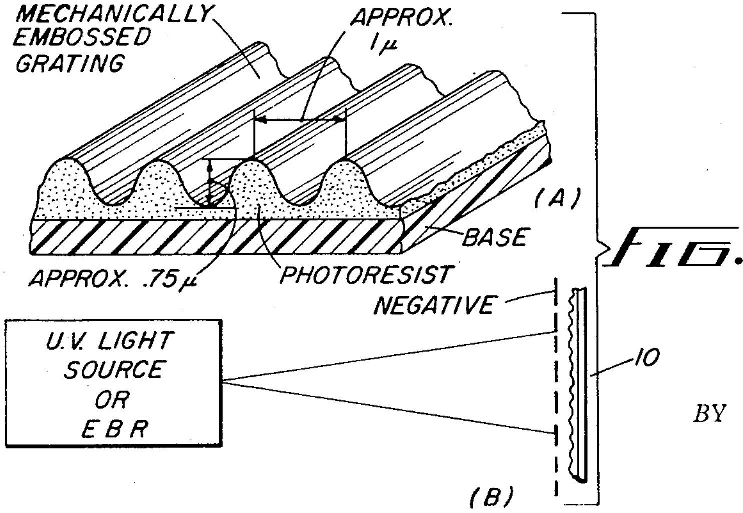
FIG. 3 is a schematic diagram illustrating the steps of an alternative method of making a master recording.

Alternatively, the diffraction-grating may be mechanically embossed in the photoresist coating, as illustrated in FIG. 3(A), the grating preferably having a spacing of approximately one micron and a depth of the order of 0.75 micron. The photoresist may be of either the positive or negative types, the type used, however, determining whether the picture information is to be exposed through a negative or positive transparency. If the photoresist is of the type that becomes insoluble when exposed to light, the picture information is exposed to a negative, and conversely, if the photoresist is of the type that becomes soluble upon exposure, the picture information is exposed through a positive. As in the method described above in connection with FIG. 1, the exposure through the transparency may be made by light to which the photoresist is sensitive, for example, ultraviolet light, or by the scanning beam of an electron beam recorder, as illustrated in FIG. 3(B). It will be evident from the previous discussion that with a proper combination of photoresist and transparency the grating will be selectively retained and washed away depending upon the gray scale of the picture information in the transparency.

Figure 4:
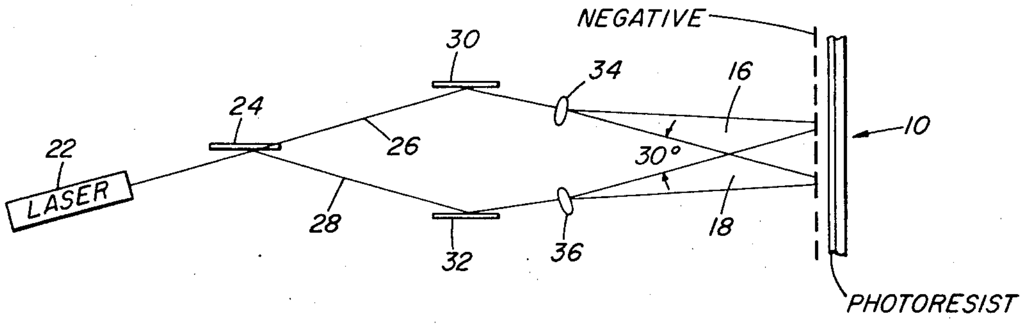
FIG. 4 is a schematic diagram illustrating another alternative method of making a master recording.

Still another method of producing the initial record, illustrated in FIG. 4, consists of the step of directing two radiant energy beams, such as a pair of laser beams 16 and 18 intersecting at an angle of about 30°, and produced by the arrangement of mirrors and lenses described in connection with FIG. 1, through a negative containing the picture information and onto a suitable photoresist coating on a film base. Thus, the photoresist is simultaneously exposed to the diffraction-grating pattern and the picture information contained in the negative transparency. Upon development of the photoresist, more or less of the diffraction-grating pattern remains (that is, the intensity of the diffraction-grating pattern varies) in accordance with the picture information.

Figure 5A:
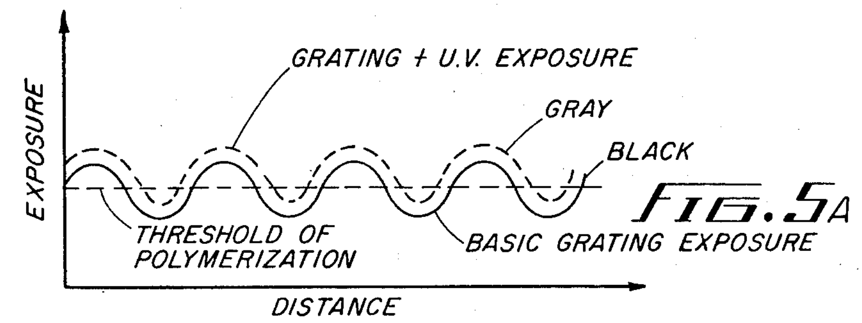
FIGS. 5A and 5B are respectively exposure curves and a greatly enlarged cross-sectional view of a diffraction grating useful in explaining how picture information is recorded on a variable area grating.
Figure 5B:
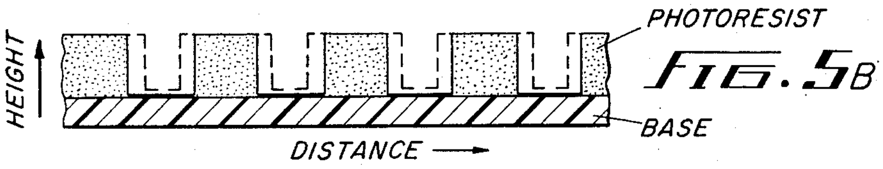

FIGS. 5A and 5B are respectively a set of exposure curves and the cross-section (greatly enlarged) of a developed photoresist depicting a high gamma, variable area recording. The photoresist material is of the type having a predetermined threshold of polymerization, indicated by the dash-line in FIG. 5A, exposure above which the photoresist remains upon development and below which it washes away. The solid line in FIG. 5A represents the basic grating exposure produced by only the interfering laser beams 16 and 18 (FIG. 4) with an intensity and time of exposure such that the curve lies alternately above and below the threshold. Upon development, then, the photoresist is washed away in those areas where the exposure curve is below the threshold and is retained where it is above to produce the pattern of solid-line ridges and grooves illustrated in FIG. 5B. If, instead, the photoresist were further exposed through a gray area of a transparency, the exposure curve would be as depicted by the dotted line in FIG. 5A, only small segments of which extend below the threshold. Thus, upon development the ridges are wider, and the grooves correspondingly narrower, than in the case of only grating exposure, as indicated by the dotted line curve in FIG. 5B. Thus, the relative width of the grooves in the developed grating is representative of the gray scale of the picture information to which the photoresist is exposed.

Figure 6:
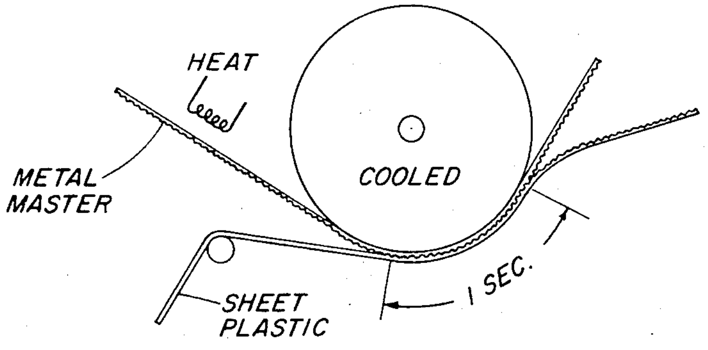
FIG. 6 is a schematic representation of apparatus for replicating release prints from a master recording.

The developed photoresist, exposed by either the above-described methods, forms a three-dimensional pattern consisting of a grating of varying density (or area in the case of FIG. 5B) in accordance with the picture information to which it was exposed. A master for replication of multiple copies of the stored information is produced by electro-forming on top of the photoresist, much in the same way that masters are made for replicating phonograph records, to produce a metal-coated tape having the same three-dimensional pattern thereon. More specifically, silver may be evaporated onto the surface of the developed photoresist, which is thereafter electroplated with nickel and copper to a thickness of several microns. As schematically illustrated in FIG. 6, multiple copies are made by pressing the master tape against a suitable release print material, which may be inexpensive sheet plastic, by heating the master tape and carrying it and the sheet plastic together over a rotating drum whereby the plastic flows into the ripples of the pattern on the master. The master and sheet plastic cool sufficiently while in contact with the drum to allow the plastic to be stripped from the master as it leaves to thereby produce a replica of the master embossed in the plastic film without any loss of resolution. By proper selection of parameters and materials, and the rotational speed of the drum, a period of contact between the master and sheet plastic of the order of one second has been found satisfactory.

Figure 8:
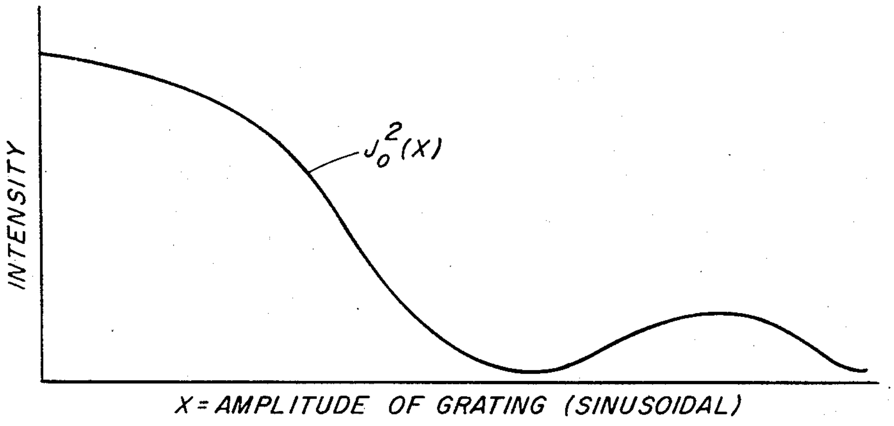
FIG. 8 is a graph illustrating the Bessel function relationship between the amplitude of a sinusoidal diffraction grating and the intensity of zero-order diffracted light.

The time and intensity of the initial exposure of the photoresist is selected so that the areas of the sheet plastic release film corresponding to the greatest transparency of the original negative (or positive) have a grating depth which causes a portion of the zero-order diffracted light from a partially collimated beam passing through the release print to be approximately one-half wave length out-of-phase with the remainder of the zero-order light as it emerges from the grating. Destructive interference occurs between the two portions of the zero-order light, and the attenuation of this light by the grating varies according to the gray scale represented by the ripple pattern on the grating. This is graphically illustrated in FIG. 8 by the well-known Bessel function relationship which shows that for a grating depth of approximately one-half wave length the intensity of the transmitted zero-order diffracted light approaches zero and increases in value as the depth of the grating is reduced.

Figure 7:
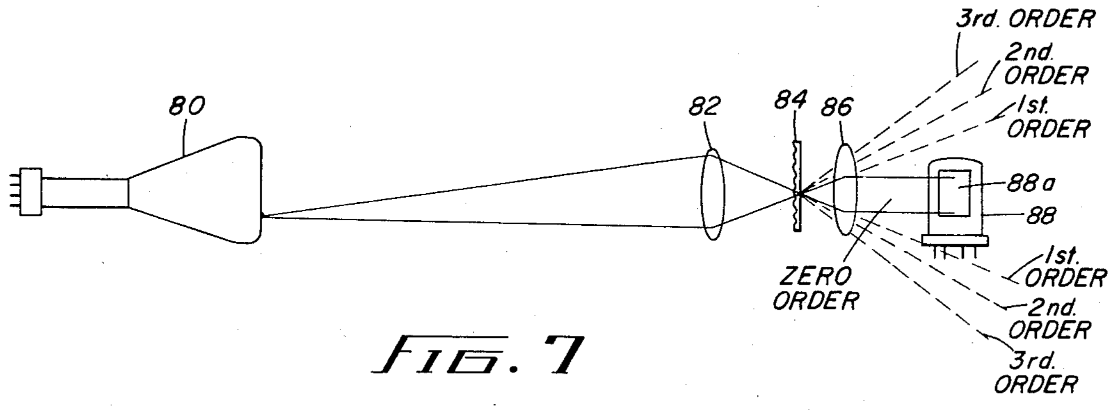
FIG. 7 is a schematic diagram of an arrangement for reproducing picture information recorded on a release print.

The information recorded on the plastic release film may be reproduced with the arrangement illustrated in FIG. 7, which includes a source of visible light, which may be the scanning spot of a flying spot scanner 80, which is focused by a suitable projection lens 82 onto the release print 84 on which picture information has been recorded in the form of variable amplitude sinusoidal diffraction grating as explained above in connection with FIGS. 1 and 2. The light transmitted by the film is viewed by the projection lens 86 having an angle of acceptance to accept the zero-order diffracted light and to exclude the first- and higher-order diffracted light, whereby the zero-order diffracted light is impressed on the photosensitive area 88*a* of a photocell 88 or similar photodetector. Thus, in those areas of the plastic record medium 84 corresponding to transparent areas of a strip of conventional photographic film, the diffraction grating will be absent and the light from source 80 will pass unaffected through the record medium 84, through lens 86, and onto photocell 88. The current generated by the photocell is proportional to the intensity of the light which strikes it, and may be utilized as a video signal for translation by conventional video playback apparatus and displayed on a suitable screen, such as on a conventional television receiver.

If a diffraction grating is present on a portion of a record medium 84 on which the light beam is incident, the light is diffracted as shown in FIG. 7 at angles such that the first-, second- and third-order diffracted light falls outside the sensitive area of the photocell and hence is not detected. The angles at which the various orders of diffracted light emerge from the grating is determined by the spacing of the grating lines, a suitable spacing, as has been noted above, being approximately one micron, and the lens 86 having an angle of acceptance which is smaller than the angles subtended by the first-order diffracted light. In short, if the first-order diffraction angle of the diffraction grating is larger than the angle subtended by the projection lens 86, and has an amplitude that gives no light in the zero-order, no signal is generated in the photocell; that is the record medium will produce a signal representative of black. However, when the amplitude of the grating is reduced in accordance with the gray scale of the picture information, more or less zero-order light reaches the photocell to produce a video signal (as the record medium is scanned) representative of the gray scale of the recorded picture information.

Alternatively, the optical system illustrated in FIGS. 25–27 of the aforementioned *IEEE Spectrum* article may be used instead of projection lens 86 for directing the diffracted light onto the photocell. The illustrated light-pipe system functions just as well because the cylindrical lenses molded in the ends thereof confronting the film (FIG. 27) and the light-pipe have limited acceptance angles which exclude first- and higher-order diffracted light. It should be noted, however, that the grating lines on the record medium should be parallel to the lines of the scanning raster because the cylindrical lenses on the ends of the light pipes focus only in that direction.

Figure 9:
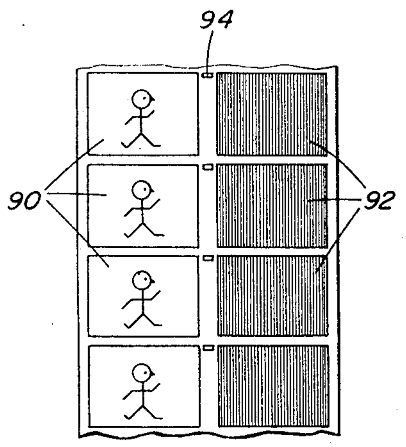
FIG. 9 is a plan view of a section of a record medium illustrating a type of picture information that may be recorded by the method of the invention.

While the invention as thus far described is adapted for recording and reproducing black-and-white picture information, it is applicable for duplication of monochrome recordings of color images in which chrominance information is present in coded form. That is, a photographic film of the type described in the aforementioned *IEEE Spectrum* article (a monochrome film containing chrominance information in coded form) may be used as the source of picture information which modulates the diffraction-grating pattern produced by one of the above-described methods. A section of a film of this type is illustrated in FIG. 9, on which a first succession of frames 90 represent luminance information of a scene, and a second succession of frames 92, arranged in side-by-side relationship with the luminance frames, contain color information in coded form which appears on the film as a series of very fine vertical bars. The film also carries, on a central longitudinal strip separating the luminance and chrominance frames, a series of synchronizing marks (or windows) 94 located adjacent the upper edges of the companion frames for providing synchronization in the reproducing apparatus between the film transport and the cathode ray tube scanner in the player. In accordance with the present invention, the monochrome film depicted in FIG. 9 is used to modify the diffraction-grating pattern on the record medium produced in accordance with either of the methods of FIG. 1, FIG. 3 or FIG. 4, whereby the grating is modified in accordance with the information on the film strip of FIG. 9.

The plastic film, bearing optical gratings, as described herein, can be used in playback apparatus of the kind described in the aforementioned *IEEE Spectrum* article, without modification, thereby providing a record medium of much lower cost than the photographic film used therein. It will be recognized, however, that a release print produced in accordance with the invention cannot be reproduced by a conventional optical contact printer, because prints of this type do not absorb light and do not allow space for the various orders of diffracted light to become separated. The present recording technique consequently provides some measure of protection against unauthorized reproduction of the content of the release print of the picture information.

I claim:

1. A method of recording information on a record medium comprising:
   - producing on the surface of the record medium a diffraction grating having a first-order diffraction angle larger than a predetermined angle and a grating pattern that gives substantially no zero-order diffracted light when visible light is directed through the grating, and
   - altering the pattern of the grating in accordance with the information to be recorded such that when visible light is directed through the grating the amount of zero-order diffracted light detectable by a detector having an angle of acceptance corresponding to said predetermined angle varies in accordance with the characteristics of the recorded information.

2. The method of claim 1 wherein said diffraction grating is produced by exposing an area of a coating of photoresist material on the surface of the record medium to two radiant energy beams intersecting at said predetermined angle,
   - modulating at least one of said beams before it impinges upon said photoresist material by causing it to pass through a transparency containing the information to be recorded and
   - developing said photoresist material.

3. The method of claim 2 wherein the radiant energy beams are beams of coherent light which intersect at the surface of the photoresist material at an angle of approximately 30° and produce a latent image in the photoresist material by the alternating constructive and destructive interference of the two beams, and
   - both of said beams are directed through a negative transparency containing the information to be recorded.

4. The method of claim 1 wherein said diffraction grating is mechanically embossed in a coating of photoresist material on the surface of the record medium,
   - the grating is altered by exposing the photoresist material by radiation directed through a transparency containing the information to be recorded, and
   - developing said photoresist material.

5. The method of claim 4 wherein said photoresist material is sensitive to ultraviolet radiation and is exposed by ultraviolet light directed through a positive transparency containing the information to be recorded.

6. The method of claim 4 wherein said photoresist material is electron-sensitive and is exposed by a scanning beam of electrons directed through a positive transparency containing the information to be recorded.

7. The method of claim 1 wherein said diffraction grating is produced by exposing an area of a coating of photoresist material on the surface of the record medium to two beams of radiant energy intersecting at said predetermined angle,
   - further exposing the photoresist material by radiation directed through a transparency containing the information to be recorded, and
   - developing said photoresist material.

8. The method of claim 7 including the further steps of:
   - electroforming a metal coating on the developed diffraction-grating pattern on the photoresist material to form a master, and
   - pressing the master against a transparent plastic film to form a duplicate copy of the developed diffraction-grating pattern.

9. The method of claim 8 wherein said pressing step includes the further steps of:
   - heating said master,
   - carrying said heated master and said plastic film together over a rotatable drum whereby said plastic film is deformed to correspond to the pattern on said master,
   - thereafter cooling said said master and plastic film, and
   - stripping said plastic film from said master.

10. The method of claim 7 wherein the radiant energy beams are beams of coherent light which intersect at the surface of the photoresist material at an angle of approximately 30° and produce a latent image in the photoresist material by the alternating constructive and destructive interference of the two beams.

11. The method of claim 10 wherein the photoresist material is further exposed by a scanning beam of electrons directed through a positive transparency containing the information to be recorded.

12. The method of claim 10 wherein the photoresist material is further exposed by ultraviolet light directed through a positive transparency containing the information to be recorded.

13. The method of claim 12 including the further steps of:
   - electroforming a metal coating on the developed diffraction-grating pattern on the photoresist material to form a master, and
   - pressing the master against a transparent plastic film to form a duplicate copy of the developed diffraction-grating pattern.

14. The method of claim 13 wherein said pressing step includes the further steps of:
   - heating said master,
   - carrying said heated master and said plastic film together in close contact with each other over a rotatable drum to cause said plastic film to be deformed to correspond to said pattern,
   - thereafter cooling said master and plastic film, and
   - stripping said plastic film from said master.

15. An information-bearing record comprising,
   - a strip of transparent film on which has been formed an optical diffraction grating having a predetermined first-order diffraction angle and a density that gives substantially no zero-order diffracted light when visible light is directed therethrough, and on which the pattern of the grating is modified in accordance with the recorded information to cause the amount of zero-order diffracted light detectable by a detector having an angle of acceptance corresponding to said diffraction angle when visible light is directed through the grating to vary in accordance with the recorded information.

16. The information-bearing record of claim 15 wherein said film comprises a transparent base and said grating is formed on a coating of photoresist material on said film base.

17. The information-bearing record of claim 15 wherein said film comprises thin, transparent sheet plastic material and said diffraction grating modified in accordance with the recorded information is mechanically embossed thereon.

18. A method of reproducing the information-bearing record of claim 15 comprising the steps of:

directing a beam of light through the record, passing the zero-order diffracted light through a lens having an angle of acceptance to exclude first- and higher-order diffracted light, and detecting the first-order diffracted light to produce an electrical signal representative of the recorded information.

19. The reproducing method of claim 18 wherein said beam of light is produced by a spot of light scanning a raster, and including the further step of directing the beam of light onto the record through a projection lens.

* * * * *